US011061585B1

(12) United States Patent
Xu et al.

(10) Patent No.: US 11,061,585 B1
(45) Date of Patent: Jul. 13, 2021

(54) INTEGRATION OF NVME DEVICE WITH DRAM CACHE SYSTEM AND METHOD

(71) Applicant: EMC IP Holding Company, LLC, Hopkinton, MA (US)

(72) Inventors: Xinlei Xu, Beijing (CN); Jian Gao, Beijing (CN); Lifeng Yang, Beijing (CN); Henry A. Spang, IV, Hopkinton, MA (US); Dmitri Prilepski, Upton, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 14 days.

(21) Appl. No.: 15/787,847

(22) Filed: Oct. 19, 2017

(51) Int. Cl.
G06F 3/06 (2006.01)
G06F 12/06 (2006.01)
G06F 9/4401 (2018.01)

(52) U.S. Cl.
CPC .......... *G06F 3/0619* (2013.01); *G06F 3/0607* (2013.01); *G06F 3/0632* (2013.01); *G06F 3/0634* (2013.01); *G06F 3/0688* (2013.01); *G06F 9/4405* (2013.01); *G06F 12/0638* (2013.01); *G06F 2212/205* (2013.01)

(58) Field of Classification Search
None
See application file for complete search history.

(56) References Cited

U.S. PATENT DOCUMENTS

| | | | | |
|---|---|---|---|---|
| 7,352,206 B1* | 4/2008 | Zhu | ........................ | G01K 7/015 |
| | | | | 326/38 |
| 7,870,439 B2* | 1/2011 | Fujiyama | ............ | G06F 11/1641 |
| | | | | 714/11 |
| 9,367,405 B1 | 6/2016 | Foley et al. | | |
| 9,645,932 B1* | 5/2017 | Bono | .................. | G06F 12/0833 |
| 9,781,027 B1* | 10/2017 | Braverman | ............. | G06F 13/16 |
| 2005/0086405 A1* | 4/2005 | Kobayashi | ............ | G06F 9/5016 |
| | | | | 710/260 |
| 2006/0206663 A1* | 9/2006 | Kuwata | ............... | G06F 12/0866 |
| | | | | 711/114 |
| 2007/0156954 A1* | 7/2007 | Trika | .................. | G06F 11/1471 |
| | | | | 711/113 |
| 2010/0076934 A1* | 3/2010 | Pershin | ............... | G06F 11/1451 |
| | | | | 707/640 |
| 2011/0022799 A1* | 1/2011 | Sugahara | ............ | G06F 12/0866 |
| | | | | 711/118 |
| 2011/0295967 A1 | 12/2011 | Wang et al. | | |
| 2014/0207992 A1* | 7/2014 | Chi | ........................ | G06F 13/32 |
| | | | | 710/308 |

(Continued)

OTHER PUBLICATIONS

Non-Final Office Action issued in U.S. Appl. No. 15/798,775 dated Apr. 18, 2019.

(Continued)

*Primary Examiner* — Sean D Rossiter
*Assistant Examiner* — Stephanie Wu
(74) *Attorney, Agent, or Firm* — Brian J. Colandreo; Mark H. Whittenberger; Holland & Knight LLP

(57) ABSTRACT

A method, computer program product, and computer system for executing one of a reboot and a startup process. A write I/O may be received at a DRAM cache. Data may be written to at least two different NVMe devices. When the data of the write I/O is completely written to the at least two different NVMe devices, a response may be sent to a driver layer.

20 Claims, 18 Drawing Sheets

(56) References Cited

U.S. PATENT DOCUMENTS

| | | | |
|---|---|---|---|
| 2015/0082081 A1* | 3/2015 | Akirav | G06F 11/1469 |
| | | | 714/6.22 |
| 2016/0034186 A1 | 2/2016 | Weiner et al. | |
| 2016/0147442 A1* | 5/2016 | Baderdinni | G06F 3/061 |
| | | | 711/105 |
| 2016/0246521 A1 | 8/2016 | Dewitt et al. | |
| 2016/0299795 A1* | 10/2016 | Kagami | G06F 9/5027 |
| 2017/0034297 A1 | 2/2017 | Waheed | |
| 2017/0078455 A1* | 3/2017 | Fisher | H04L 69/03 |
| 2017/0220406 A1* | 8/2017 | Parnell | G06F 11/0778 |
| 2017/0255583 A1* | 9/2017 | Shih | G06F 13/4068 |
| 2017/0372075 A1* | 12/2017 | Lu | G06F 1/24 |
| 2018/0173425 A1 | 6/2018 | Feng et al. | |
| 2018/0173466 A1 | 6/2018 | Yang et al. | |
| 2018/0181318 A1 | 6/2018 | Kumabe et al. | |
| 2018/0188971 A1* | 7/2018 | Palangappa | G06F 3/0611 |
| 2018/0241717 A1* | 8/2018 | Bond | H04L 63/02 |
| 2018/0253385 A1* | 9/2018 | Baxter | G06F 12/109 |
| 2018/0285198 A1* | 10/2018 | Dantkale | G06F 12/128 |
| 2018/0302469 A1 | 10/2018 | Yang et al. | |
| 2018/0314421 A1* | 11/2018 | Linkovsky | G06F 3/061 |
| 2018/0314666 A1* | 11/2018 | Tanaka | G06F 13/1668 |
| 2019/0034306 A1 | 1/2019 | Wysocki et al. | |
| 2019/0065064 A1 | 2/2019 | Jin et al. | |

OTHER PUBLICATIONS

Notice of Allowance issued in U.S. Appl. No. 15/798,775 dated Aug. 9, 2019.

\* cited by examiner

INTEGRATION OF NVME DEVICE WITH DRAM CACHE SYSTEM AND METHOD

BACKGROUND

Generally, with the increasing amounts of information being stored, it may be beneficial to efficiently store and manage that information. While there may be numerous techniques for storing and managing information, each technique may have tradeoffs between reliability and efficiency.

BRIEF SUMMARY OF DISCLOSURE

In one example implementation, a method, performed by one or more computing devices, may include but is not limited to executing, by a computing device, one of a reboot and a startup process. A write I/O may be received at a DRAM cache. Data may be written to at least two different NVMe devices. When the data of the write I/O is completely written to the at least two different NVMe devices, a response may be sent to a driver layer.

One or more of the following example features may be included. One of the reboot and the startup process may be executed only via a first storage processor. Executing may include verifying that one or more parameters of a second storage processor match the first storage processor. Executing may further include transferring cache page metadata from the second storage processor to the first storage processor. One of the reboot and the startup process may be executed via a dual storage processor including a first storage processor and a second storage processor. Executing may include syncing memory allocation with the first storage processor and the second storage processor. It may be determined whether the write I/O received at the DRAM cache is one of a write miss, a clean page write hit, and a dirty page write hit by searching a hash table.

In another example implementation, a computing system may include one or more processors and one or more memories configured to perform operations that may include but are not limited to executing one of a reboot and a startup process. A write I/O may be received at a DRAM cache. Data may be written to at least two different NVMe devices. When the data of the write I/O is completely written to the at least two different NVMe devices, a response may be sent to a driver layer.

One or more of the following example features may be included. One of the reboot and the startup process may be executed only via a first storage processor. Executing may include verifying that one or more parameters of a second storage processor match the first storage processor. Executing may further include transferring cache page metadata from the second storage processor to the first storage processor. One of the reboot and the startup process may be executed via a dual storage processor including a first storage processor and a second storage processor. Executing may include syncing memory allocation with the first storage processor and the second storage processor. It may be determined whether the write I/O received at the DRAM cache is one of a write miss, a clean page write hit, and a dirty page write hit by searching a hash table.

In another example implementation, a computer program product may reside on a computer readable storage medium having a plurality of instructions stored thereon which, when executed across one or more processors, may cause at least a portion of the one or more processors to perform operations that may include but are not limited to executing one of a reboot and a startup process. A write I/O may be received at a DRAM cache. Data may be written to at least two different NVMe devices. When the data of the write I/O is completely written to the at least two different NVMe devices, a response may be sent to a driver layer.

One or more of the following example features may be included. One of the reboot and the startup process may be executed only via a first storage processor. Executing may include verifying that one or more parameters of a second storage processor match the first storage processor. Executing may further include transferring cache page metadata from the second storage processor to the first storage processor. One of the reboot and the startup process may be executed via a dual storage processor including a first storage processor and a second storage processor. Executing may include syncing memory allocation with the first storage processor and the second storage processor. It may be determined whether the write I/O received at the DRAM cache is one of a write miss, a clean page write hit, and a dirty page write hit by searching a hash table.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
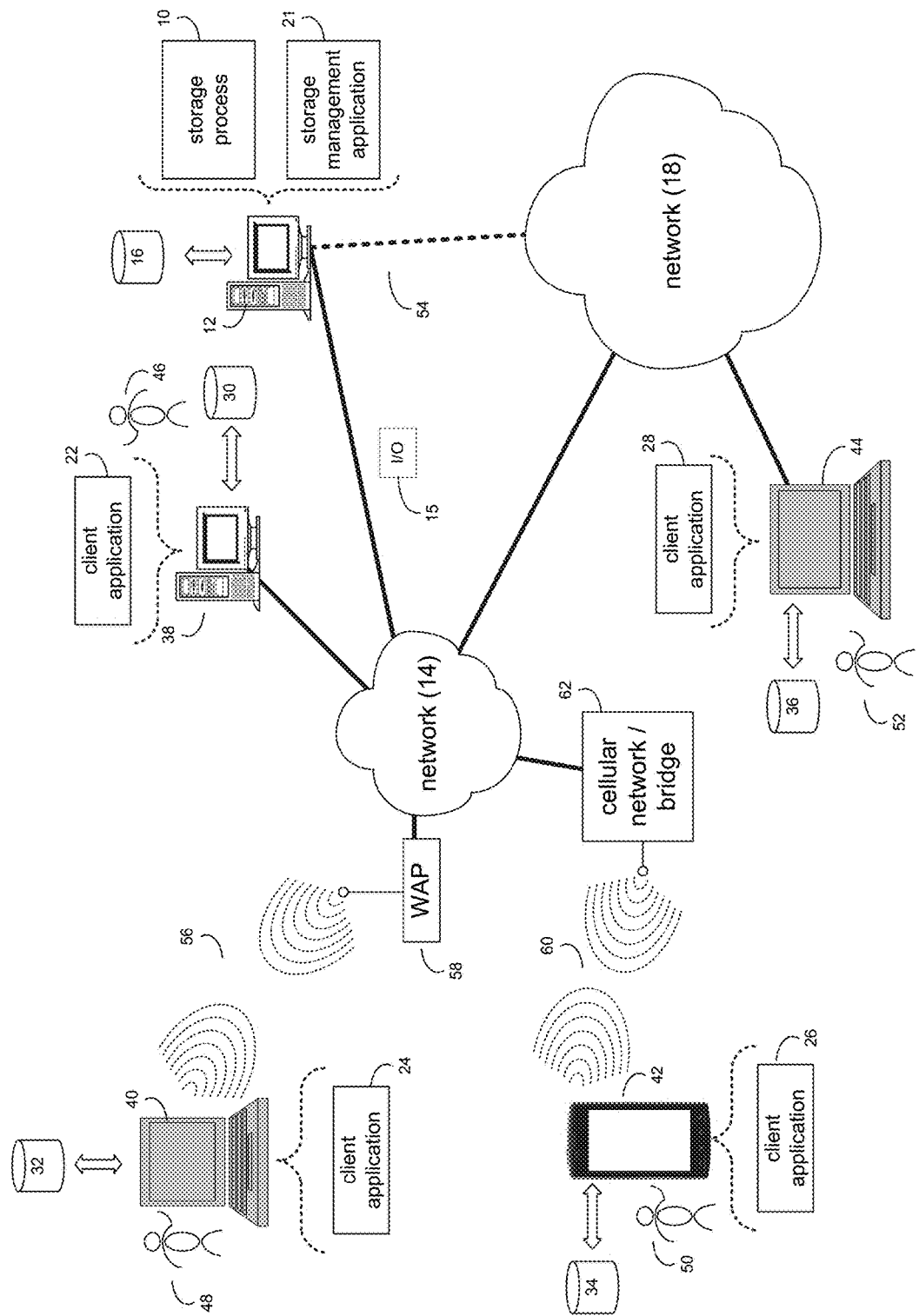
FIG. 1 is an example diagrammatic view of a storage process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java °, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown storage process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a storage process, such as storage process 10 of FIG. 1, may execute, by a computing device, one of a reboot and a startup process. A write I/O may be received at a DRAM cache. Data may be written to at least two different NVMe devices. When the data of the write I/O is completely written to the at least two different NVMe devices, a response may be sent to a driver layer.

In some implementations, the instruction sets and subroutines of storage process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, storage process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network. An example cloud computing environment that may be used with the disclosure may include but is not limited to, e.g., Elastic Cloud Storage (ECS™) from Dell EMC™ of Hopkinton, Mass. In some implementations, other cloud computing environments may be used without departing from the scope of the disclosure.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, storage process 10 and/or storage management application 21 may be accessed via one or more of client applications 22, 24, 26, 28. In some implementations, storage process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within storage process 10, a component of storage process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of storage process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM).

Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of storage process 10 (and vice versa). Accordingly, in some implementations, storage process 10 may be a purely server-side application, a purely client-side application, or a hybrid server-side/client-side application that is cooperatively executed by one or more of client applications 22, 24, 26, 28 and/or storage process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, storage process 10, and storage management application 21, taken singly or in any combination, may effectuate some or all of the same functionality, any description of effectuating such functionality via one or more of client applications 22, 24, 26, 28, storage process 10, storage management application 21, or combination thereof, and any described interaction(s) between one or more of client applications 22, 24, 26, 28, storage process 10, storage management application 21, or combination thereof to effectuate such functionality, should be taken as an example only and not to limit the scope of the disclosure.

In some implementations, one or more of users 46, 48, 50, 52 may access computer 12 and storage process 10 (e.g., using one or more of client electronic devices 38, 40, 42, 44) directly through network 14 or through secondary network 18. Further, computer 12 may be connected to network 14 through secondary network 18, as illustrated with phantom link line 54. Storage process 10 may include one or more user interfaces, such as browsers and textual or graphical user interfaces, through which users 46, 48, 50, 52 may access storage process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
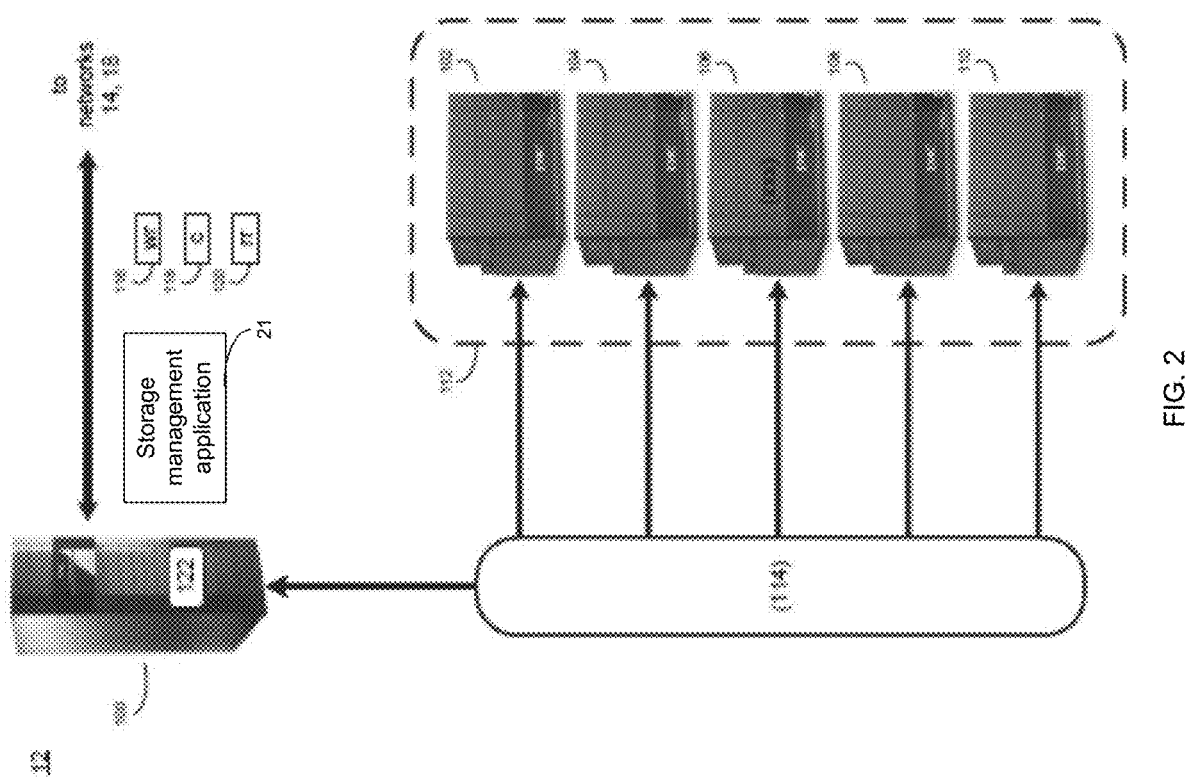
FIG. 2 is an example diagrammatic view of a computer of FIG. 1 according to one or more example implementations of the disclosure.
Figure 3:
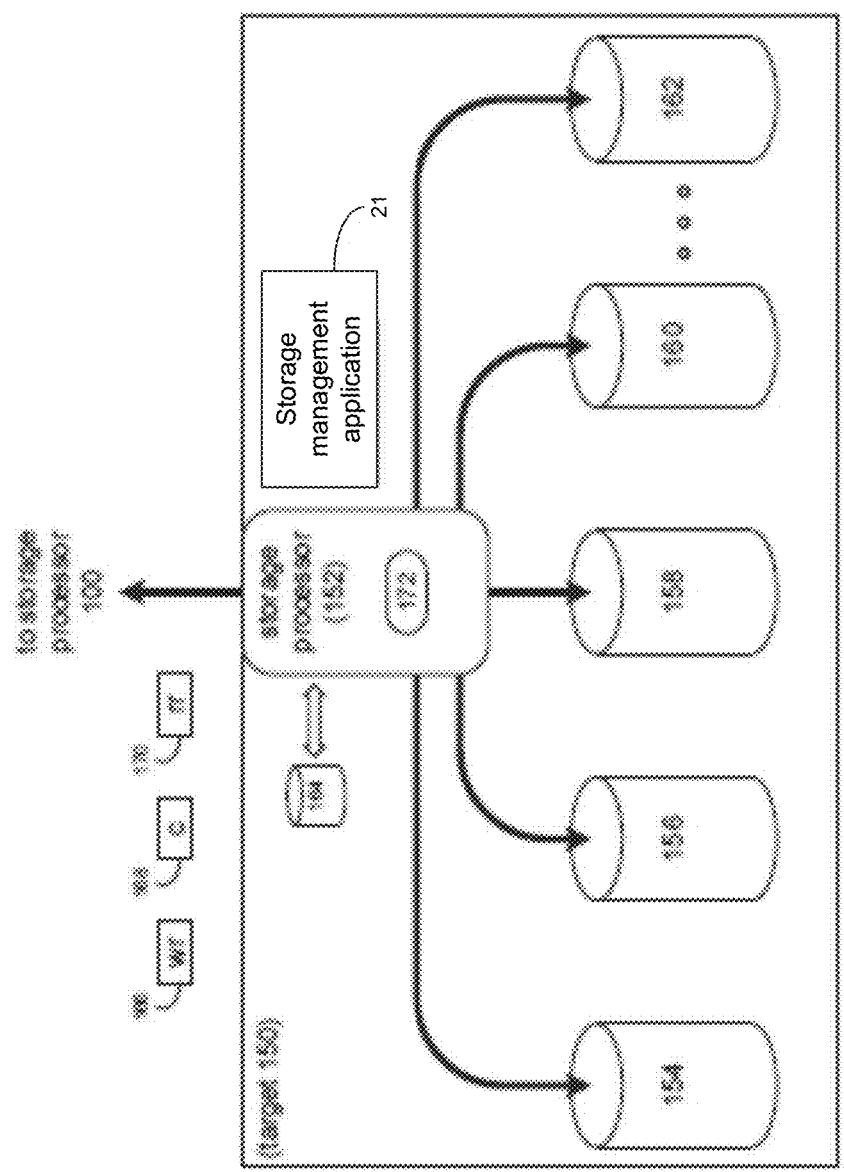
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management application 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management application 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management application 21). Additionally/alternatively (e.g., when storage processor 100 is configured as an application server or otherwise), content 118 to be written to computer 12 may be internally generated by storage processor 100 (e.g., via storage management application 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or storage process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management application 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. Examples of storage devices 154, 156, 158, 160, 162 may include one or more electro-mechanical hard disk drives, one or more solid-state/flash devices, and/or any of the above-noted storage devices.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management application 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management application 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management application 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management application 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management application 21) and initially stored (e.g., via storage management application 21) within front end cache memory system 172.

As will be discussed in greater detail below, storage process 10 may enable DRAM Cache to use a Non-Volatile Memory Express (NVMe) device as a write cache to, e.g., accelerate user write I/Os, reduce the internal data traffic between storage processors (SPs), increase overall disk array performance, and reduce cache implementation complexity for, e.g., midrange disk arrays. For instance, by using the example NVMe standard, the NVMe device (e.g., via storage process 10) may support a dual PCI-E port, so that the storage processor may integrate the NVMe device(s) into a storage processor rack without needing to involve the PCI-E switch, which may help reduce the cost of midrange disk arrays. Additionally, since both storage processors may access each other's NVMe device, avoidance of data copy between the storage processors may be achieved.

Figure 4:
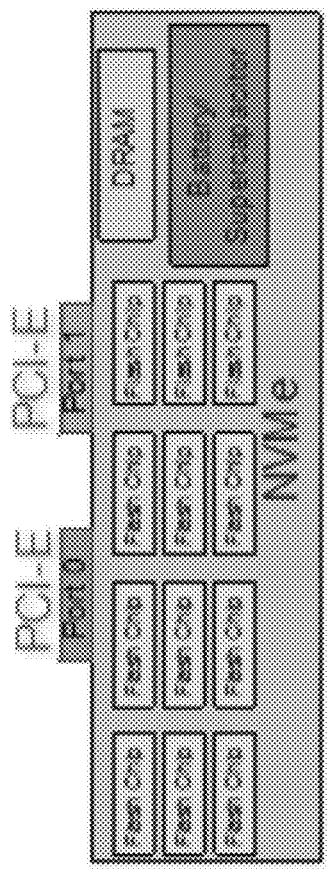
FIG. 4 is an example diagrammatic view of an example dual PCI-E Port NVMe device according to one or more example implementations of the disclosure.

Normally in a disk array, a dynamic RAM (DRAM) Cache may be in the top of the I/O data path, and the DRAM Cache may cache the hottest data, and user data may be stored in HDD matrixes. Normal HDD disk may be used to store the user data and serve the I/O request, which generally is not handled by the DRAM cache, and may provide the slowest response time, where these HDDs may be combined as a RAID group to provide the required capacity and data redundancy. Generally, and referring at least to the example FIG. 4, an example dual PCI-E Port NVMe device 400 is shown. In the example, the NVMe device (at least in the latest standard) may act as a block device to provide normal block device I/O interface, and may support dual-port PCI-E, so that one NVMe device may be connected to, e.g., two hosts.

Figure 5:
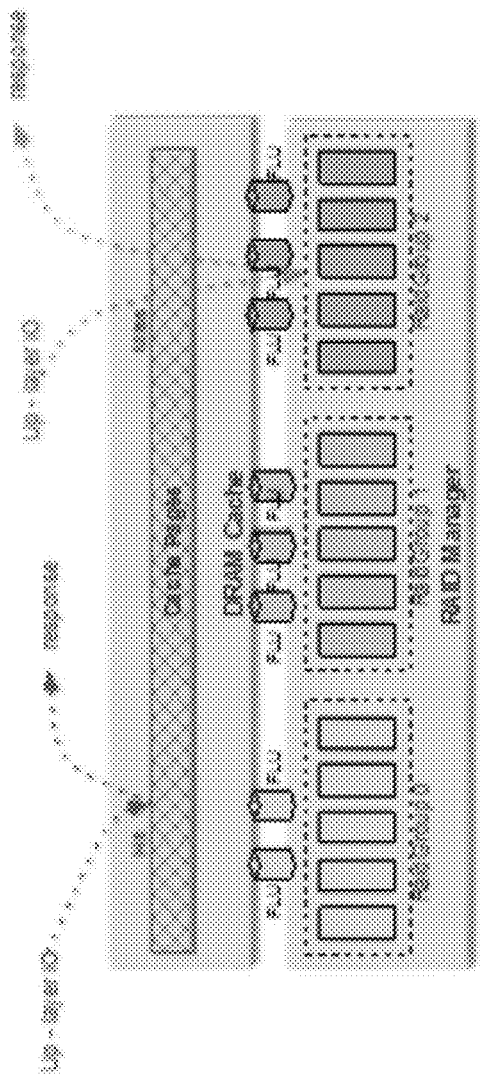
FIG. 5 is an example diagrammatic view of an example DRAM Cache/RAID Manager stack overview according to one or more example implementations of the disclosure.

Referring at least to the example FIG. 5, an example DRAM Cache/RAID Manager stack overview 500 is shown. Traditional DRAM Caches may typically only use DRAM as cache media to cache the hottest data, and serve the host write I/Os. When a DRAM Cache receives a read I/O from upper (up) layer driver, it may search its cache pages to find if it is a cache hit (if the required page had already been cached), and the DRAM Cache may response to the up layer driver I/O request with the cached pages. Otherwise, the DRAM Cache may forward this request to let the RAID Manager read data from the HDD and send the response to the up layer driver. When the DRAM Cache receives a write I/O from the up layer driver, it may acquire the exclusive lock between storage processors to protect the data as being unable to be accessed before the write is done, and may store the data from the write I/O into the DRAM, then respond to the up layer driver.

Figure 6:
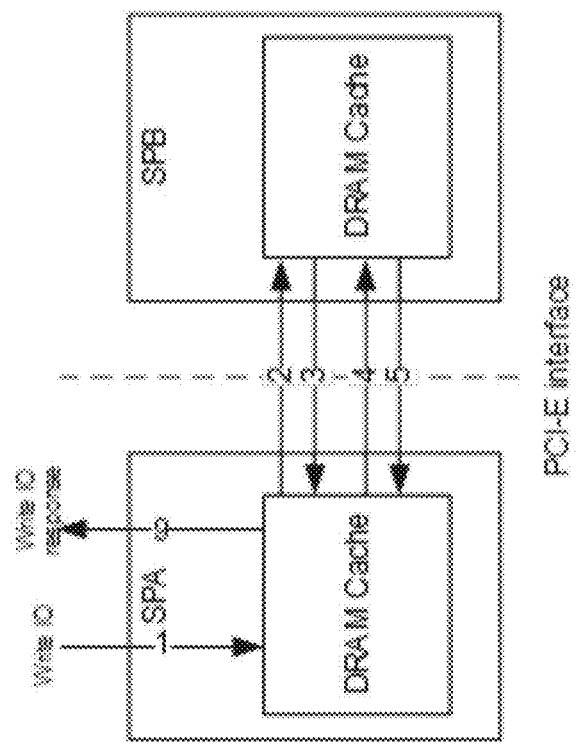
FIG. 6 is an example diagrammatic view of an example block diagram 600 of how a current DRAM Cache may handle write I/Os according to one or more example implementations of the disclosure.
Figure 7:
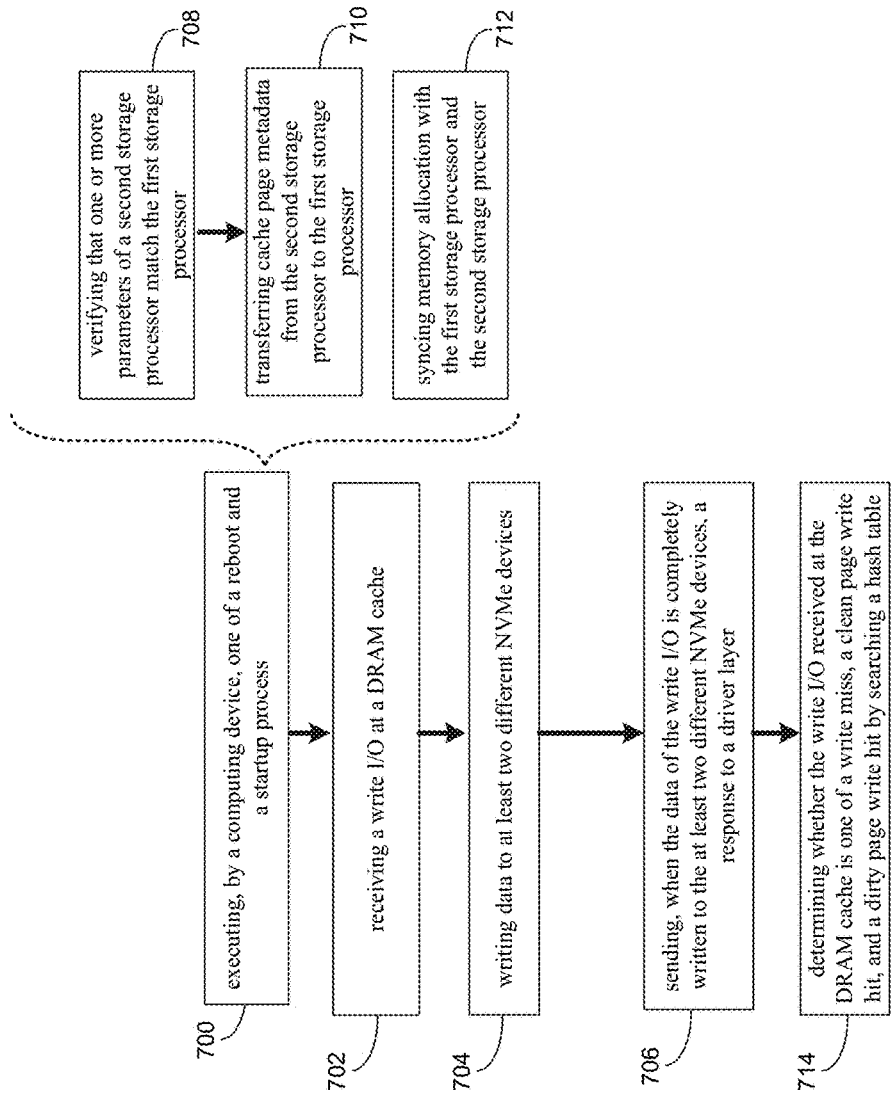
FIG. 7 is an example flowchart of a storage process according to one or more example implementations of the disclosure.

Referring at least to the example FIG. 6, an example block diagram 600 of how a current DRAM Cache may handle write I/Os is shown. In current DRAM Cache implementations, the DRAM Cache may act as a read/write cache. In order not to lose data, dirty data are typically cached in both storage processors (e.g., SPA and SPB), and when the write I/O is received and dirty data is kept in both SPs' DRAM, then a response I/O may be sent to the up layer driver. As seen in FIG. 6, each write I/O (step 1) comes from one storage processor, metadata communication occurs between the two storage processors (steps 2 and 3) and data may need to be copied (steps 4 and 5) to the peer storage processor by CMI (PCI-E interface) before the write I/O response may be sent (step 6). In current implementations, the DRAM Cache may be mirroring dirty data between the two storage processors, which may take a large amount of bandwidth (e.g., 70%-80%) of the CMI interface, and may become a performance bottleneck (at least during hardware scale up).

As will be discussed below, storage process 10 may at least help, e.g., the improvement of an existing storage technology, necessarily rooted in computer technology in order to overcome an example and non-limiting problem specifically arising in the realm of data storage. For instance, storage process 10 may use an efficient storage process enabling the integration of NVMe devices with DRAM cache for improved write I/O acceleration.

The Storage Process:

As discussed above and referring also at least to the example implementations of FIGS. 7-18, storage process 10 may execute 700, by a computing device, one of a reboot and a startup process. Storage process 10 may receive 702 a write I/O at a DRAM cache. Storage process 10 may write 704 data to at least two different NVMe devices. Storage process 10 may send 706 a response to a driver layer when the data of the write I/O is completely written to the at least two different NVMe devices.

Figure 8:
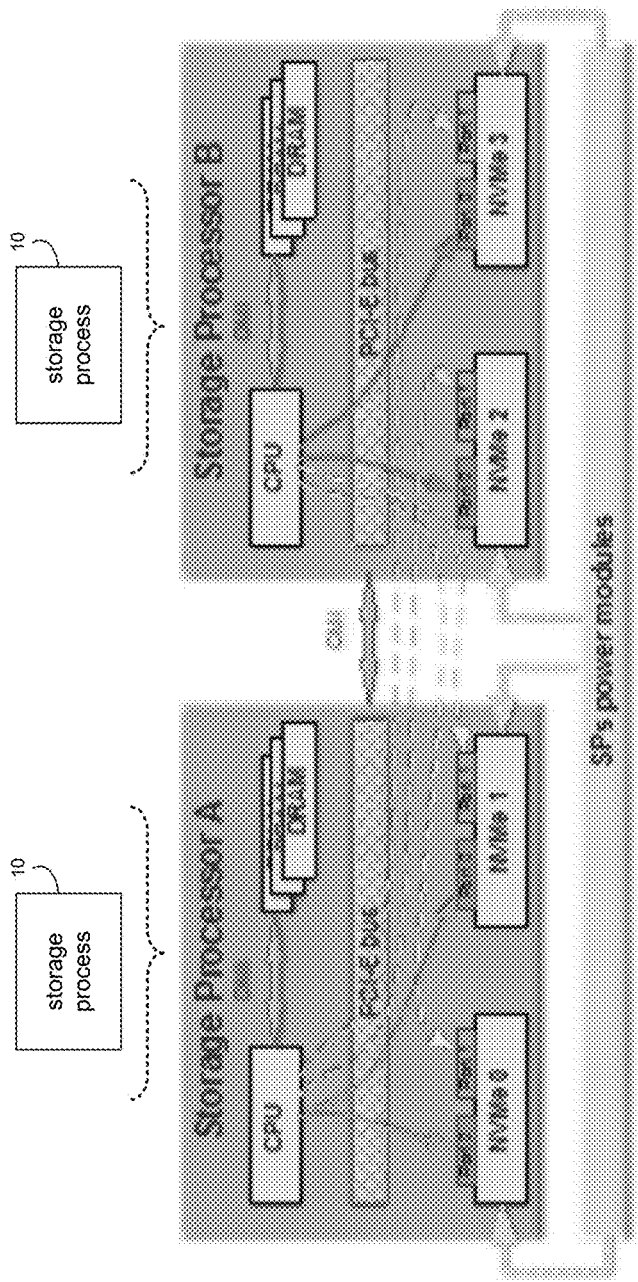
FIG. 8 is an example diagrammatic view of integrating NVMe devices according to one or more example implementations of the disclosure.

Referring at least to the example implementation of FIG. 8, an example block diagram 800 integrating NVMe devices is shown. Some example systems, such as the Unity system provided from Dell EMC™, may be able to insert several NVMe devices into storage processor rack(s). For instance, FIG. 8 shows an example of four NVMe devices inserted into two storage processors. In the example, storage processor A (SPA) includes an inserted NVMe 0/NVMe 1 device, where storage processor A may connects to NVMe 0/1 devices' ports 0, and connect its peer storage processors' (SPB) VNMe 2/3 Port 1. Storage processor B may include an inserted NVMe 2/NVMe 3 device, and storage processor B may connect to NVMe 2/3 devices' ports 0, and connect to its peer storage processors' (SPA) NVMe 0/1 ports 1. In the example, these four NVMe devices' power may be connected to storage processor power modules, so that when one storage processor is in a panic or reboot mode, the peer storage processor may still use the PCI-E link to access the rebooting/panic storage processor's NVMe device.

While the disclosure is described with the use of a Unity storage system and particular numbers of devices (e.g., NVMe, storage processors, DRAM, etc.), it will be appreciated that other storage systems and other numbers of devices may be used without departing from the scope of the disclosure.

Figure 9:
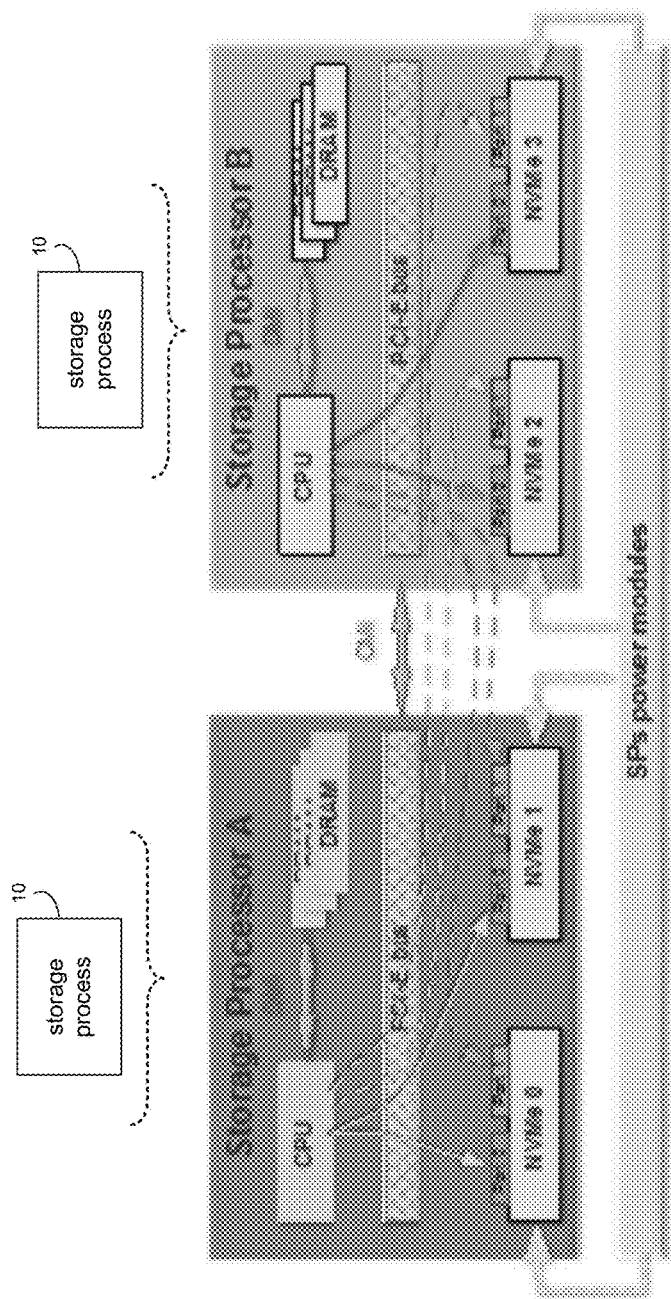
FIG. 9 is an example diagrammatic view of a storage processor rebooting/Panic with integrating NVMe devices according to one or more example implementations of the disclosure.

Referring at least to the example implementation of FIG. 9, an example block diagram 900 of storage processor A rebooting/Panic is shown. In the example, storage processor B (via storage process 10) may still access all the NVMe devices. In the example, if it were storage processor B that was rebooting or panic, storage processor A may also (via storage process 10) still have access to all the NVMe devices. Using this example hardware architecture, the DRAM Cache may only need to persist cache page metadata into the NVMe device. Compared to known hardware architectures where the DRAM Cache may need to store all the dirty pages into disks to make sure there is no data loss, the new architecture disclosed may require less battery and may reduce the hardware cost.

Figure 10:
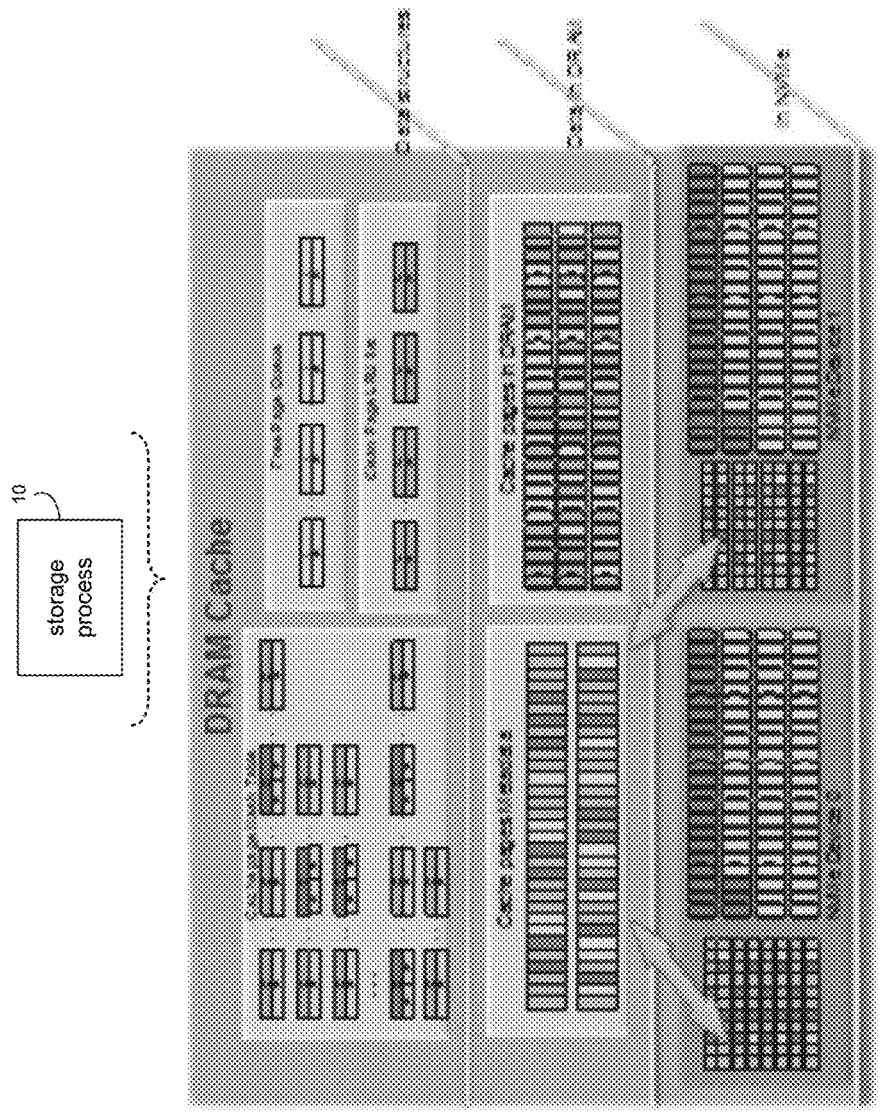
FIG. 10 is an example diagrammatic view of an example DRAM Cache structure and page management according to one or more example implementations of the disclosure.

Referring at least to the example implementation of FIG. 10, an example block diagram 1000 of DRAM Cache structures and page management is shown. In the example, the NVMe device is involved in the DRAM Cache, so that cache page management (via storage process 10) may adapt to this new device. As can be seen from FIG. 10, the brief data structure and page/metadata mapping relationship is shown. In the example, there are three layers in the DRAM Cache from the page management point of view.

Regarding the data structure layer, it essentially may have all the page management structures. When an I/O (e.g., I/O 15) comes to the DRAM Cache, storage process 10 may first search the hash table to find if it is a cache hit, and if it is a cache hit, storage process 10 may write the data to the cache pages. If it is a cache miss, storage process 10 may allocate a free page from, e.g., Free_Page_Queue:

In some implementations, if the I/O is a write I/O, storage process 10 may map the page from the NVMe device, and may write them into the two NVMe devices at the same time. When the write completes, storage process 10 may send a response to the up layer driver. In some implementations, if the I/O is a read I/O, storage process 10 may allocate a page from the DRAM, and use that memory to send it to the RAID Manager to read that data from the HDDs, where storage process 10 may send a response to the up layer driver.

For the DRAM layer, there is shown the basic structures allocated in DRAM, including the page metadata and cache pages.

For the NVMe Layer, it may include the management of the NVMe devices, where each of the NVMe devices may be split into a data namespace and a metadata namespace. The metadata namespace may be used to store the DRAM Cache metadata for the DRAM when the storage processor is shutdown or panic. The data namespace may be used to store the dirty write data from the up layer driver.

Figure 11:
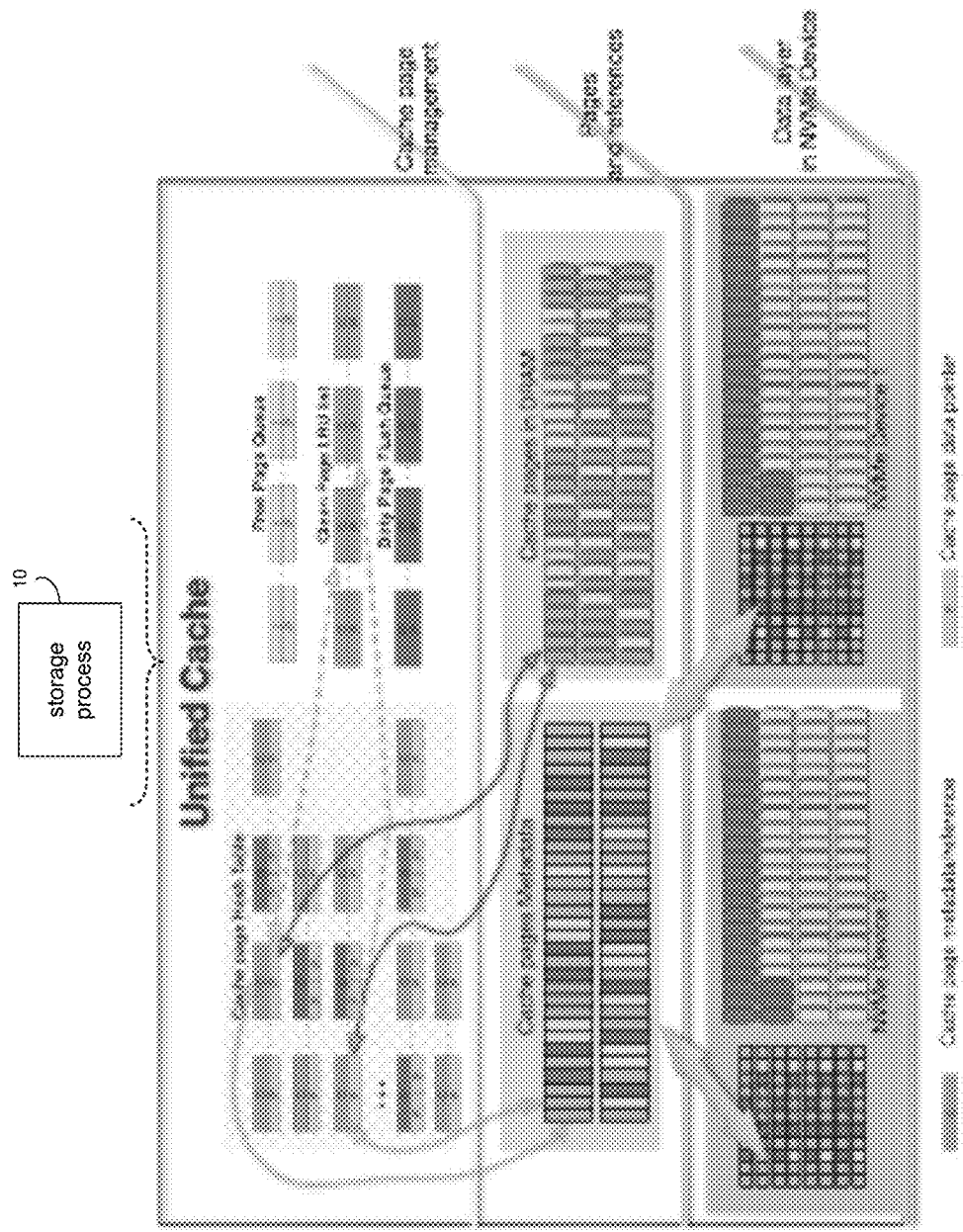
FIG. 11 is an example diagrammatic view of a clean page mapping in DRAM Cache according to one or more example implementations of the disclosure.

Referring at least to the example implementation of FIG. 11, an example block diagram 1100 of clean page mapping in DRAM Cache is shown. In the example, for clean pages, the metadata of clean page may be linked by storage process 10 in a hash table, and the metadata may point to the cached pages in, e.g., Unified Cache, and linked into the clean page LRU (least recently used) list to track the hotness of pages (e.g., whether cached pages are cold enough to evict out of cache). In some implementations, when the cache free page number is zero, storage process 10 may select the coldest page from the clean page LRU list.

Figure 12:
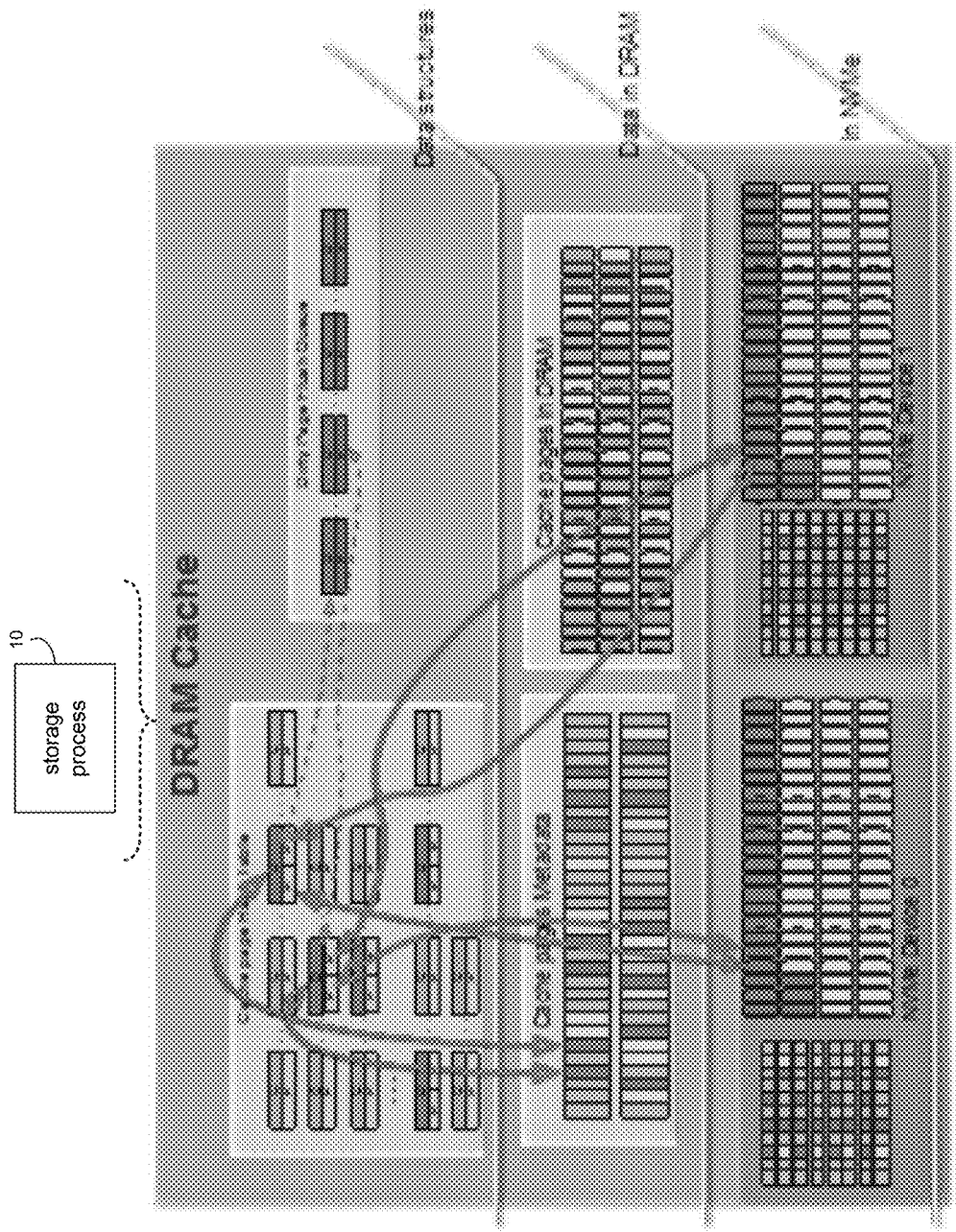
FIG. 12 is an example diagrammatic view of dirty page mapping in DRAM Cache according to one or more example implementations of the disclosure.

Referring at least to the example implementation of FIG. 12, an example block diagram 1200 of dirty page mapping in the DRAM Cache is shown. As seen in FIG. 12, the dirty page may have two copies in two different NVMe devices, so that any one device failure/offline will not lose data. Dirty page metadata may be linked by storage process 10 to a hash table for cache search, and may also be linked in Dirty Page Flush Queue for cleaning the dirty pages to HDDs.

Dirty Page Flush Queue may be a logical block address (LBA) sorted queue.

Figure 13:
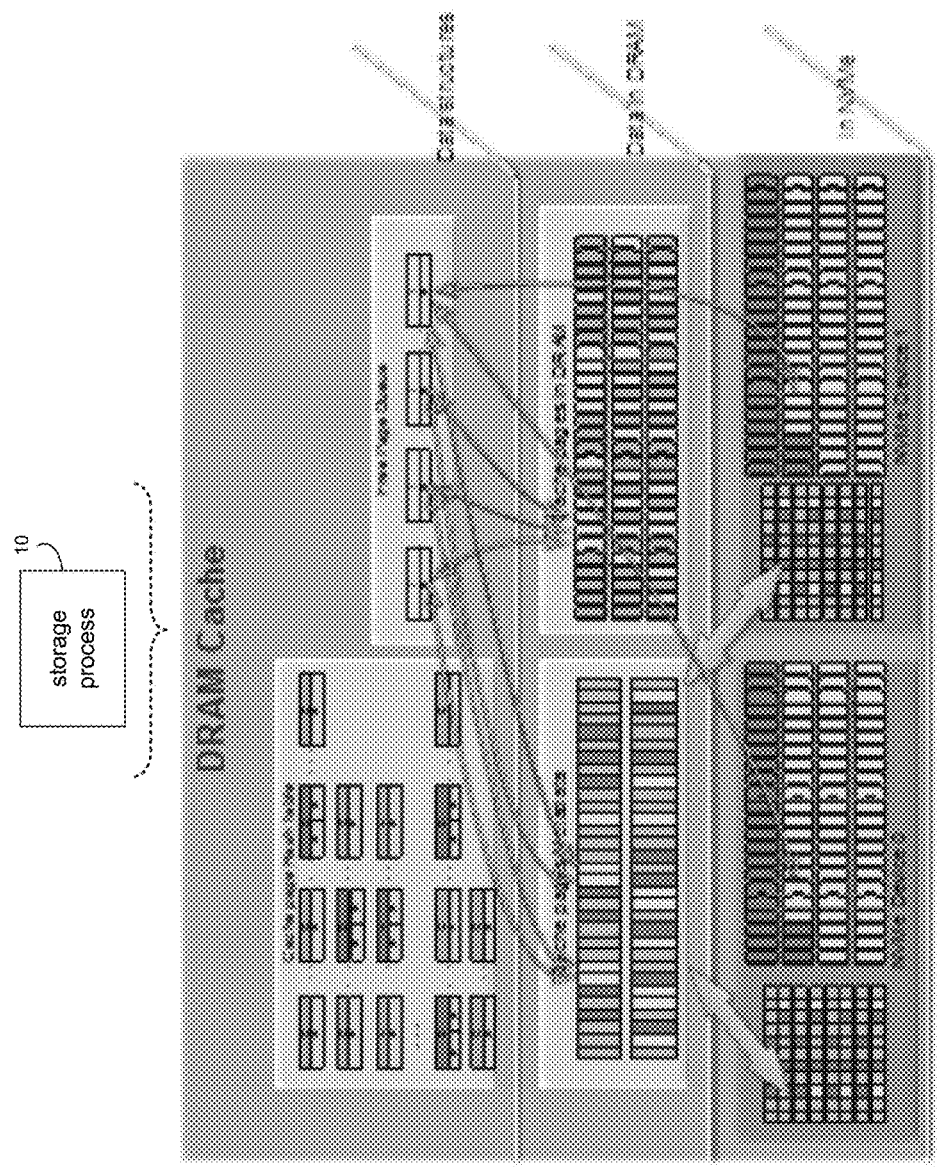
FIG. 13 is an example diagrammatic view of free/invalid page management in DRAM cache according to one or more example implementations of the disclosure.

Referring at least to the example implementation of FIG. 13, an example block diagram 1300 of free/invalid page management in the DRAM cache is shown. In the example, the free/invalid pages may be cached pages, which has not yet been used to cache data, which may indicate that there is no cache data in this page. In some implementations, the free/invalid pages may be managed by storage process 10 in Free_Page_queue, where these free pages may be contributed from the DRAM cache pages or NVMe Cache pages.

As noted above, in some implementations, storage process 10 may execute 700, by a computing device, one of a reboot and a startup process. For example, during a storage processor reboot/startup, storage process 10 may set up the DRAM Cache, the cache page metadata, cache pages and related structures, similar to the disk array configuration shown in FIG. 8, where by example only there is shown four NVMe devices in two storage processors. In some implementations, one of the reboot and the startup process may be executed 700 only via a first storage processor, where executing 700 may include verifying 708 that one or more parameters of a second storage processor match the first storage processor, and where executing 700 may further include transferring 710 cache page metadata from the second storage processor to the first storage processor.

Figure 14:
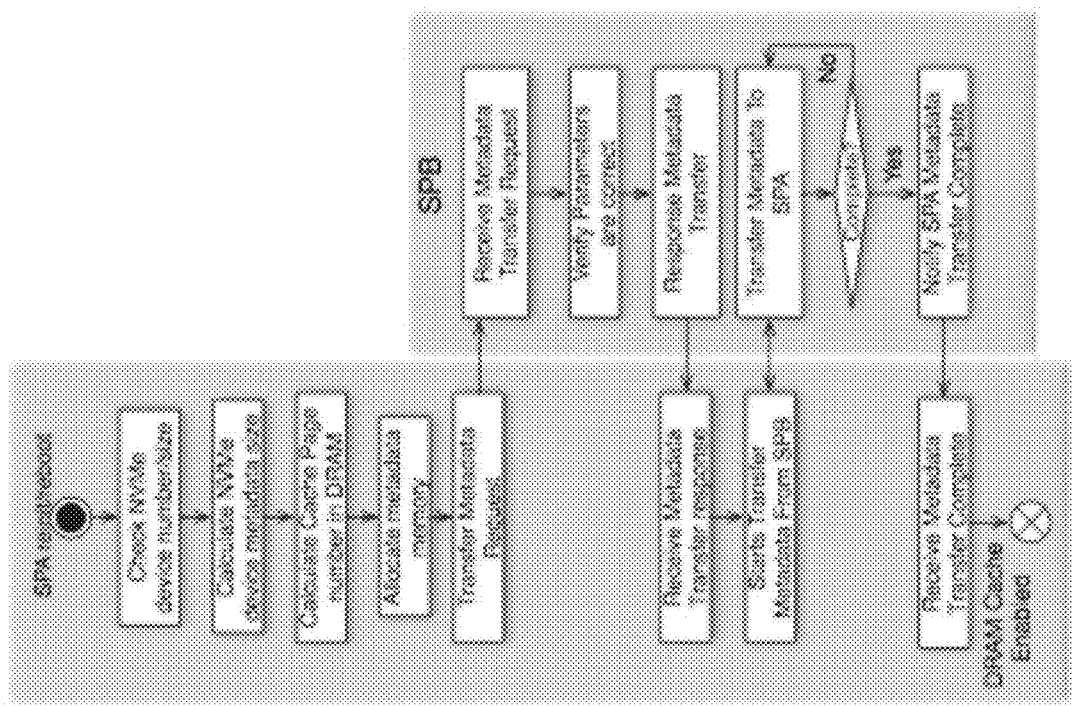
FIG. 14 is an example flowchart of a storage process according to one or more example implementations of the disclosure.

For example, and referring at least to the example implementation of FIG. 14, an example flow chart for a single storage processor reboot/panic (startup) is shown. In the example, storage processor A may request that the surviving storage processor B transfer its metadata, and thus there may not be a need to reload metadata from the NVMe device(s). In some implementations, the first three steps ("Check NVMe device number/size"; "Calculate NVMe device metadata size"; "Calculate Cache page number in DRAM") may be the pre-load status, where storage process 10 may check the cache space and calculate how many cache pages will be used for caching, and where storage process 10 may obtain the clean cache page number ($n_c$), the dirty cache page number ($n_d$), and the metadata memory size ($s_m$). The "Transfer Metadata Request" step may involve storage process 10 sending $n_d$ and $n_c$ to storage processor B to sync the cache page number, and storage process 10 may request that storage processor B transfer its cache page metadata to storage processor A. In the example, storage processor B (via storage process 10) may verify these parameter ($n_c$, $n_d$, and $s_m$) to verify 708 they are correct (i.e., the same as in storage processor B). If these parameters are correct, storage processor B (via storage process 10) may send a response to storage processor A to start transferring the metadata, where storage processor B (via storage process 10) may then transfer 710 its cache page metadata to storage processor A. When the cache page metadata transfer is completed, storage processor A (via storage process 10) may then enter an ENABLED state.

In some implementations, one of the reboot and the startup process may be executed 700 via a dual storage processor including a first storage processor and a second storage processor, where executing 700 may include syncing 712 memory allocation with the first storage processor and the second storage processor. For example, if there is a dual storage processor reboot/startup, both storage processors may need to flush the metadata to the NVMe device metadata namespace, and when the storage processors boot up, the DRAM Cache (via storage process 10) may reload data from the metadata namespace from each NVMe device.

Figure 15:
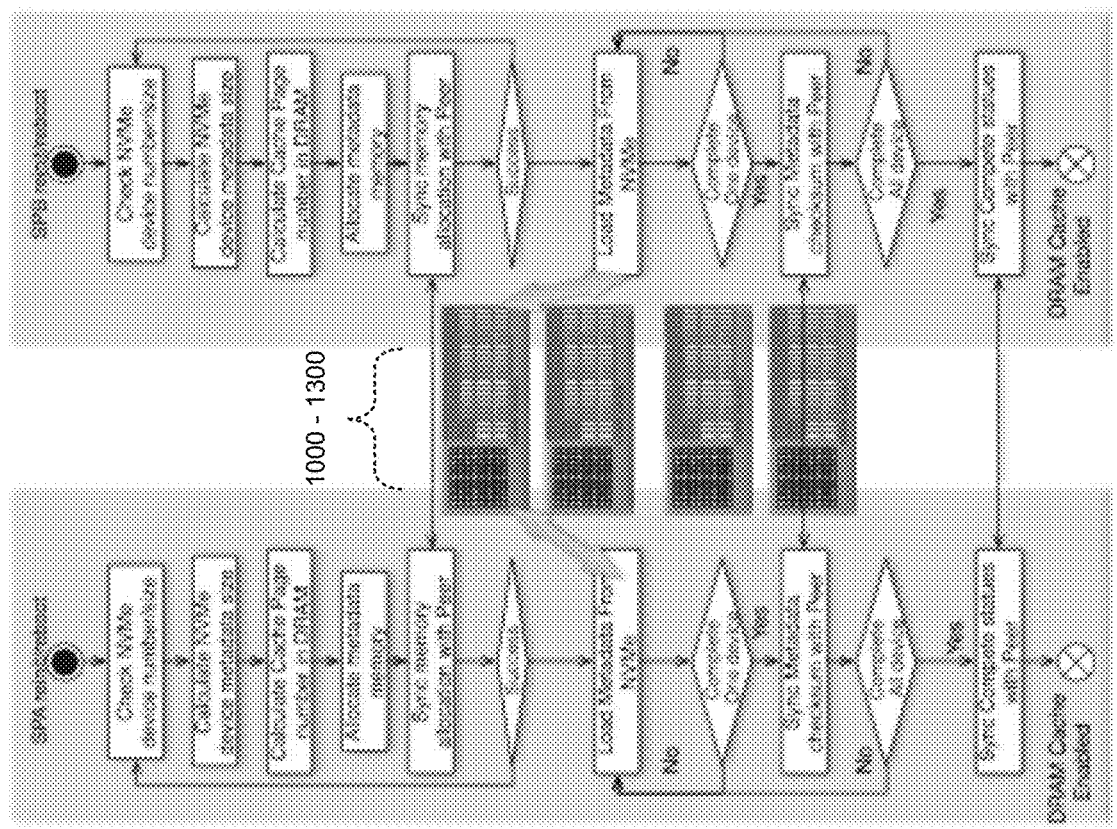
FIG. 15 is an example flowchart of a storage process according to one or more example implementations of the disclosure.
Figure 16:
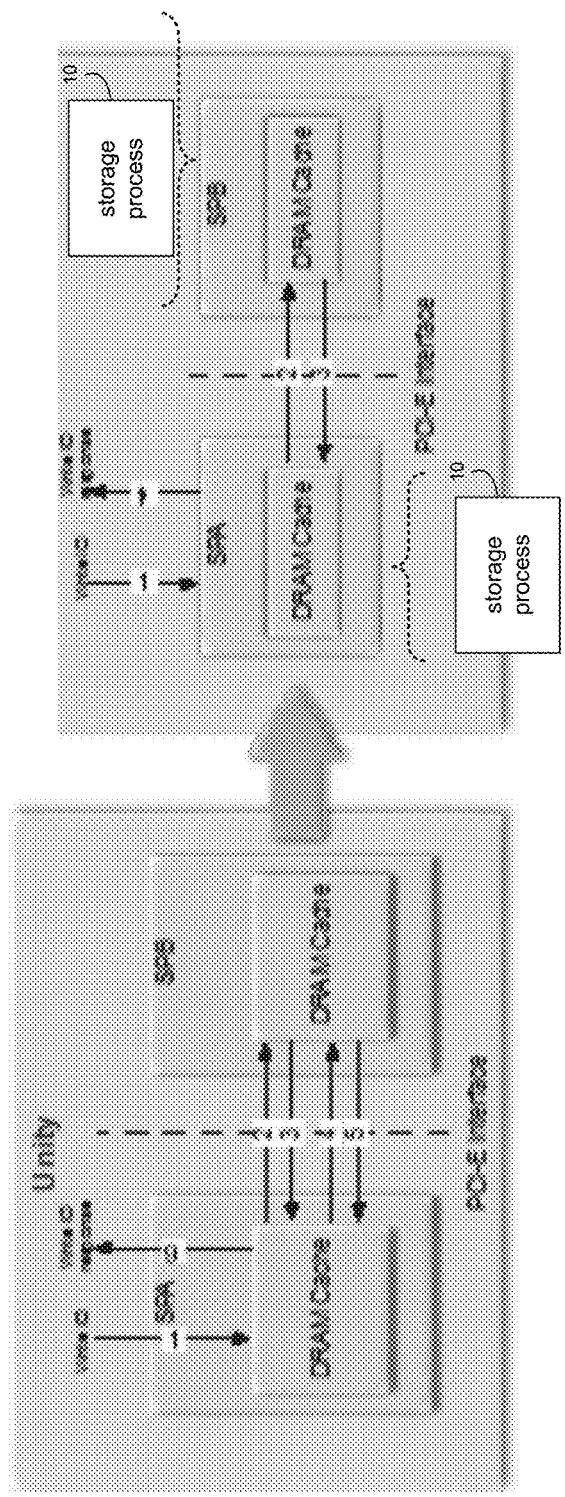
FIG. 16 is an example diagrammatic view of differences between handling write I/Os according to one or more example implementations of the disclosure.
Figure 17:
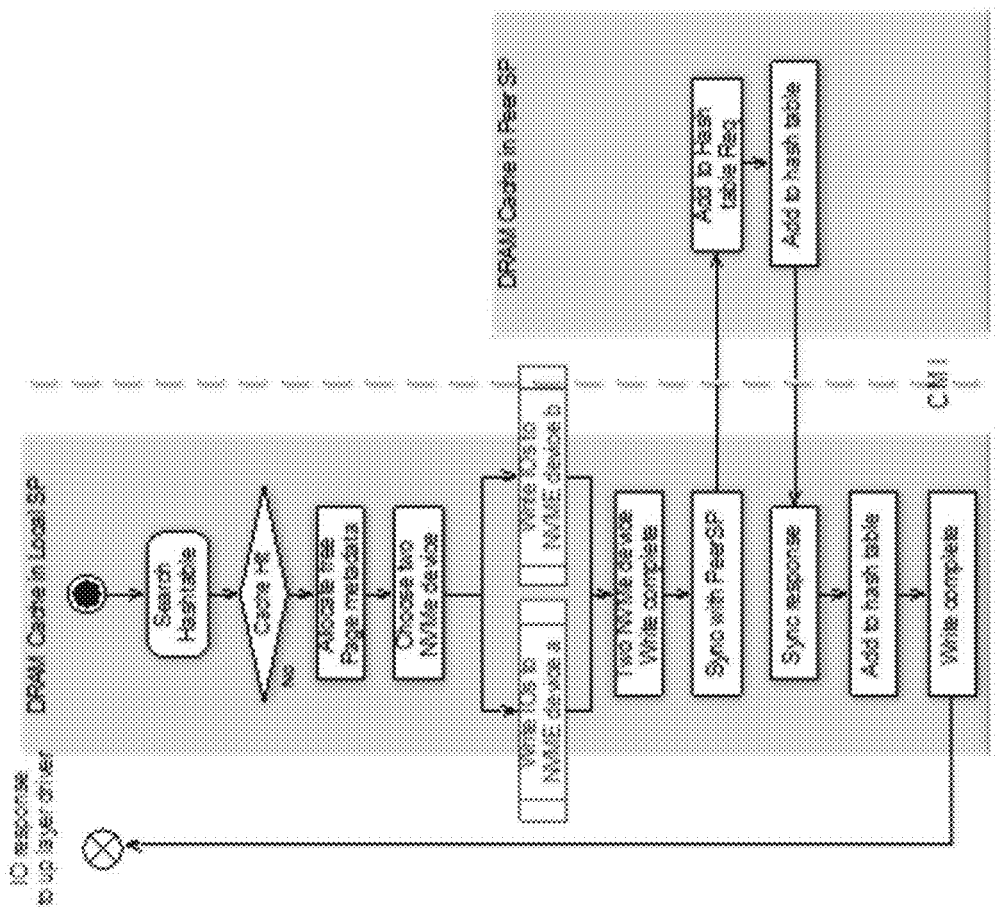
FIG. 17 is an example flowchart of a storage process according to one or more example implementations of the disclosure.

For example, and referring at least to the example implementation of FIG. 15, an example flow chart for a dual storage processor reboot/panic (startup) is shown. In the example, both storage processors (via storage process 10) may need to load metadata from the four NVMe devices. In some implementations, when a device metadata load is completed in one of the storage processors, that storage processor (via storage process 10) may need to sync 712 the metadata checksum with its peer storage processor to make sure that both storage processors obtain the same metadata. When the metadata load completes on both storage processors, then both storage processor's DRAM Cache may enter an ENABLED status and may serve up layer driver I/Os.

For example, in some implementations, the first three steps ("Check NVMe device number/size"; "Calculate NVMe device metadata size"; "Calculate Cache page number in DRAM") may be the pre-load status, where storage process 10 may check the cache space and calculate how many cache pages will be used for caching, and where storage process 10 may obtain the clean cache page number ($n_c$), the dirty cache page number ($n_d$), and the metadata memory size ($s_m$). In the "Sync memory allocation with Peer" steps, storage processor A and storage processor B (via storage process 10) may sync 712 the $n_c$, $n_d$, and $s_m$ parameters between each storage processor to verify the metadata size and memory size are correct (the same). If correct, storage process 10 may move on to the next steps, and if failed (not the same), the NVMe Cache (via storage process 10) may enter to the first step to start the reload again. In some implementations, in the "load metadata From NVMe" step, both storage processors (via storage process 10) may load cache page metadata from the NVMe device. When the NVMe Cache loads page metadata from one NVMe device, the NVMe Cache (via storage process 10) may calculate the checksum and sync the checksum with its peer SP to make sure both storage processors get the same metadata. If the NVMe Cache load page metadata completes, storage process 10 may sync with its peer, and only when both storage processor's load metadata completes, then both storage processors may enter into an ENABLED state.

In some implementations, storage process 10 may receive 702 a write I/O at a DRAM cache, and in some implementations, storage process 10 may determine 714 whether the write I/O received at the DRAM cache is one of a write miss, a clean page write hit, and a dirty page write hit by searching a hash table. For example, when the DRAM Cache (via storage process 10) handles write I/Os received 702 from up layer driver, generally, there may be two kinds of results, one is write miss, the other is write hit. When a write I/O comes to the DRAM Cache, storage process 10 may search the hash table to see if the target data (e.g., by Logical Block Address (LBA) and LUN) has already been cached in the DRAM Cache. If so, it is a write hit, and otherwise it is a write miss. As shown in example FIG. 16, there is shown a block diagram 1600 showing differences between handling write I/Os comparing known implementations (left) and the example implementation of storage process 10 (right). As can be seen, the example implementation of storage process 10 has reduced the internal data copy between two the two storage processors.

In some implementations, storage process 10 may write 704 data to at least two different NVMe devices, and may send 706 a response to a driver layer when the data of the write I/O is completely written to the at least two different NVMe devices. For example, regarding a write I/O miss, and referring at least to the example implementation of FIG. 17, an example flow chart of handling a write I/O miss is shown. In the example, the DRAM Cache (via storage process 10) may need to allocate a new page metadata to track the write I/O. In some implementations, storage process 10 may then write 704 the data to two different NVMe devices. When both NVMe devices complete the write, the DRAM Cache (via storage process 10) may store this metadata into the hash table, and may then send 706 a response (e.g., a report) that the write has been completed to the up layer driver.

Figure 18:
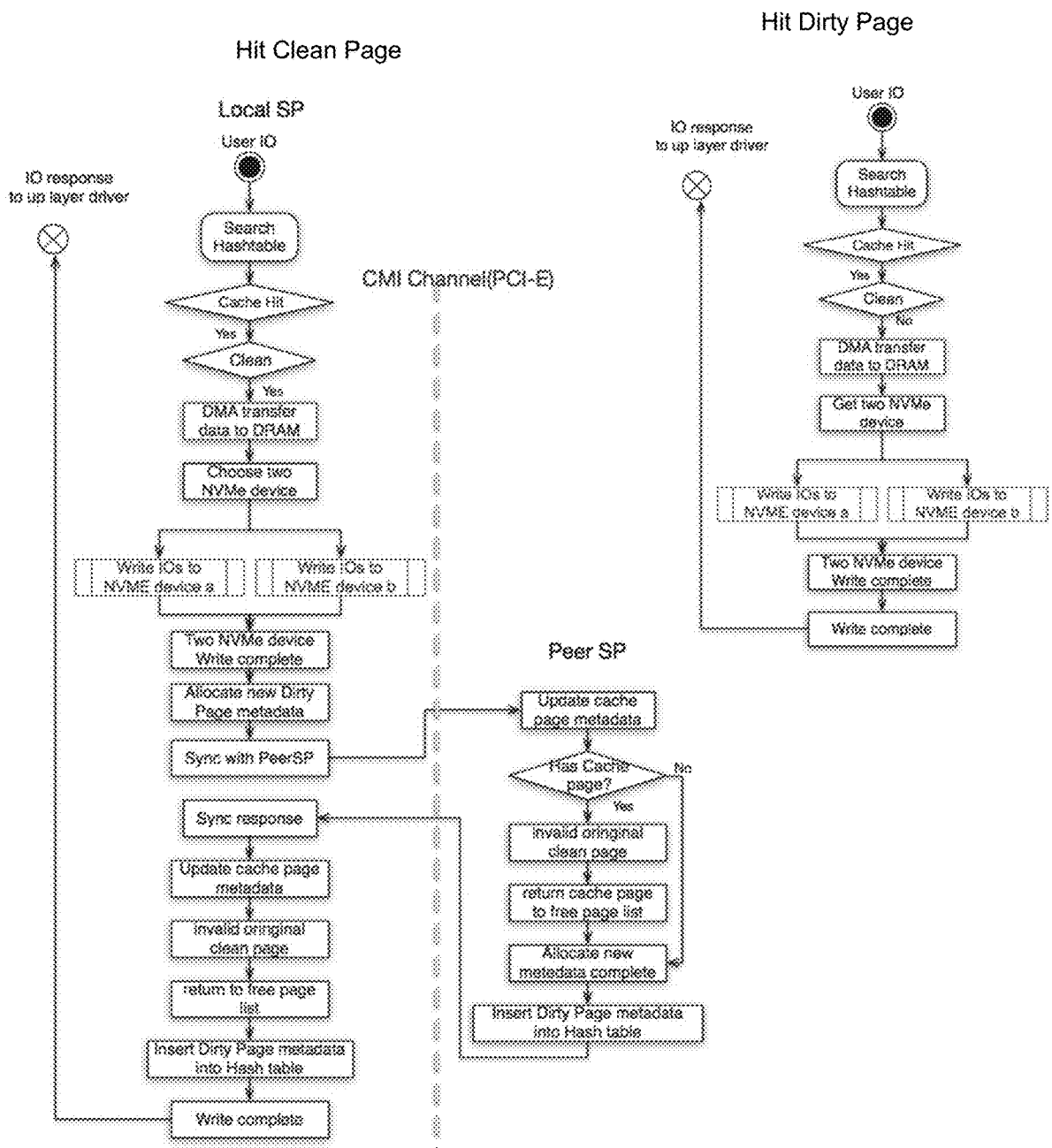
FIG. 18 is an example flowchart of a storage process according to one or more example implementations of the disclosure.

Similarly, regarding a write I/O hit, and referring at least to the example implementation of FIG. 18, an example flow chart of handling a write I/O hit is shown. In the example, if the DRAM Cache (via storage process 10 finds that the up layer write is cache hit, storage process 10 may need to distinguish been two types of cache hits. For instance, the write I/O may be a hit clean page or a hit dirty page, where the process to handle each may differ.

For instance, if it is a hit clean page, storage process 10 may sync the associated page's metadata with its peer, and then then write 704 the associated data to two different NVMe devices. When both NVMe devices complete the write, the DRAM Cache (via storage process 10) may update this metadata into the hash table, invalidate the clean page in the DRAM Cache, and may then send 706 a response (e.g., a report) that the write has been completed to the up layer driver.

If it is a hit dirty page, storage process 10 may use the local storage processor to write 704 the latest data to the two NVMe devices. When both NVMe devices complete the write, storage process 10 may then send 706 a response (e.g., a report) that the write has been completed to the up layer driver.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
executing, by a computing device, one of a reboot and a startup process;
receiving a write I/O at a DRAM cache;
writing data of the write I/O to at least two different Non-Volatile Memory Express (NVMe) devices, wherein a first NVMe device of the at least two different NVMe devices is housed in a first storage processor and a second NVMe device of the at least two different NVMe devices is housed in a second storage processor, wherein the first NVMe device of the at least two different NVMe devices is concurrently coupled to a first CPU housed within the first storage processor and a second CPU housed within the second storage processor directly through dual PCI-E ports located within the first NVMe device of the at least two different NVMe devices and the second NVMe device of the at least two different NVMe devices is concurrently coupled to the second CPU housed within the second storage processor and the first CPU housed within the first storage processor directly through dual PCI-E ports located within the second NVMe device of the at least two different NVMe devices; and
sending, when the data of the write I/O is completely written to the at least two different NVMe devices, a response to a driver layer.

2. The computer-implemented method of claim 1 wherein one of the reboot and the startup process is executed only via the first storage processor.

3. The computer-implemented method of claim 2 wherein executing includes verifying that one or more parameters of the second storage processor match the first storage processor, wherein the one or more parameters comprise a clean cache page number, a dirty cache page number, and a metadata memory size.

4. The computer-implemented method of claim 3 wherein executing further includes transferring cache page metadata from the second storage processor to the first storage processor.

5. The computer-implemented method of claim 1 wherein one of the reboot and the startup process is executed via a dual storage processor including a first storage processor and a second storage processor.

6. The computer-implemented method of claim 5 wherein executing includes syncing memory allocation with the first storage processor and the second storage processor.

7. The computer-implemented method of claim 1 further comprising:
determining whether the write I/O received at the DRAM cache is one of a write miss, a clean page write hit, and a dirty page write hit by searching a hash table.

8. A computer program product residing on a non-transitory computer readable storage medium having a plurality of instructions stored thereon which, when executed across one or more processors, causes at least a portion of the one or more processors to perform operations comprising:
- executing, by a computing device, one of a reboot and a startup process;
- receiving a write I/O at a DRAM cache;
- writing data of the write I/O to at least two different Non-Volatile Memory Express (NVMe) devices, wherein a first NVMe device of the at least two different NVMe devices is housed in a first storage processor and a second NVMe device of the at least two different NVMe devices is housed in a second storage processor, wherein the first NVMe device of the at least two different NVMe devices is concurrently coupled to a first CPU housed within the first storage processor and a second CPU housed within the second storage processor directly through dual PCI-E ports located within the first NVMe device of the at least two different NVMe devices and the second NVMe device of the at least two different NVMe devices is concurrently coupled to the second CPU housed within the second storage processor and the first CPU housed within the first storage processor directly through dual PCI-E ports located within the second NVMe device of the at least two different NVMe devices; and
- sending, when the data of the write I/O is completely written to the at least two different NVMe devices, a response to a driver layer.

9. The computer program product of claim 8 wherein one of the reboot and the startup process is executed only via the first storage processor.

10. The computer program product of claim 9 wherein executing includes verifying that one or more parameters of the second storage processor match the first storage processor.

11. The computer program product of claim 10 wherein executing further includes transferring cache page metadata from the second storage processor to the first storage processor.

12. The computer program product of claim 8 wherein one of the reboot and the startup process is executed via a dual storage processor including a first storage processor and a second storage processor.

13. The computer program product of claim 12 wherein executing includes syncing memory allocation with the first storage processor and the second storage processor.

14. The computer program product of claim 8 wherein the operations further include:
- determining whether the write I/O received at the DRAM cache is one of a write miss, a clean page write hit, and a dirty page write hit by searching a hash table.

15. A computing system including one or more processors and one or more memories configured to perform operations comprising:
- executing, by a computing device, one of a reboot and a startup process;
- receiving a write I/O at a DRAM cache;
- writing data of the write I/O to at least two different Non-Volatile Memory Express (NVMe) devices, wherein a first NVMe device of the at least two different NVMe devices is housed in a first storage processor and a second NVMe device of the at least two different NVMe devices is housed in a second storage processor, wherein the first NVMe device of the at least two different NVMe devices is concurrently coupled to a first CPU housed within the first storage processor and a second CPU housed within the second storage processor directly through dual PCI-E ports located within the first NVMe device of the at least two different NVMe devices and the second NVMe device of the at least two different NVMe devices is concurrently coupled to the second CPU housed within the second storage processor and the first CPU housed within the first storage processor directly through dual PCI-E ports located within the second NVMe device of the at least two different NVMe devices; and
- sending, when the data of the write I/O is completely written to the at least two different NVMe devices, a response to a driver layer.

16. The computing system of claim 15 wherein one of the reboot and the startup process is executed only via the first storage processor.

17. The computing system of claim 16 wherein executing includes verifying that one or more parameters of the second storage processor match the first storage processor and transferring cache page metadata from the second storage processor to the first storage processor.

18. The computing system of claim 15 wherein one of the reboot and the startup process is executed via a dual storage processor including a first storage processor and a second storage processor.

19. The computing system of claim 15 wherein the operations further include:
- determining whether the write I/O received at the DRAM cache is one of a write miss, a clean page write hit, and a dirty page write hit by searching a hash table.

20. The computer-implemented method of claim 1 wherein the first NVMe device of the at least two different NVMe devices and the second NVMe device of the at least two different NVMe devices each comprise a data namespace portion and a metadata namespace portion, wherein the metadata namespace portion is configured to store DRAM Cache metadata for the DRAM when either the first storage processor or the second storage processor is shutdown or in a panic state.

\* \* \* \* \*